J. H. BULL.
AUTOMOBILE GEARING LOCK.
APPLICATION FILED JULY 26, 1911.
1,036,186.
Patented Aug. 20, 1912.
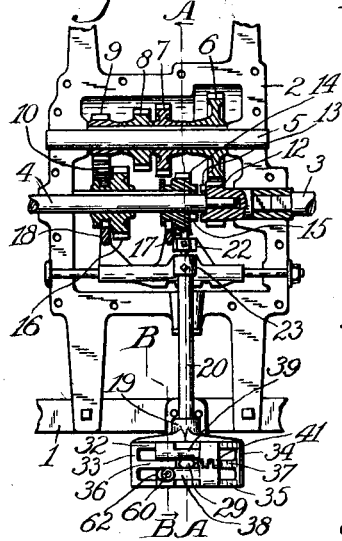
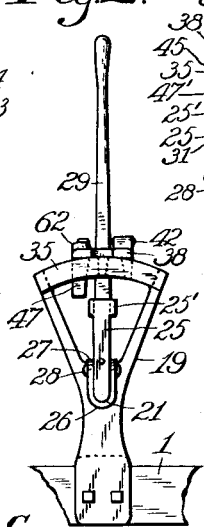
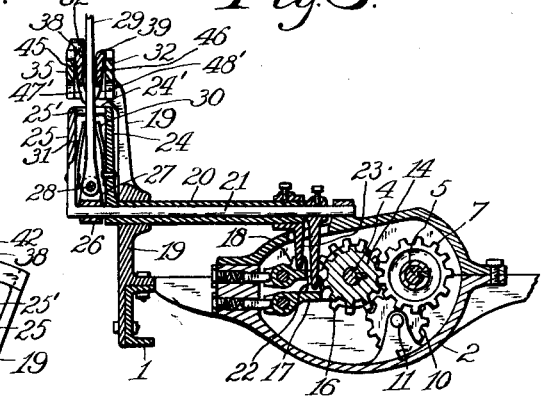
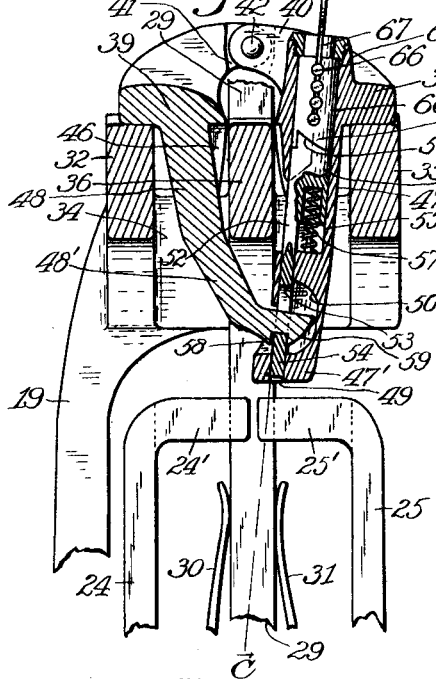
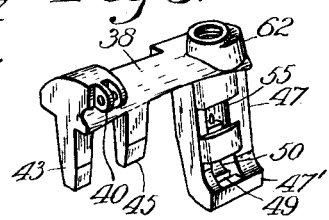
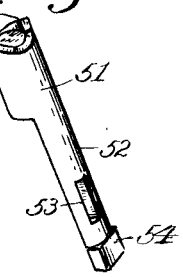
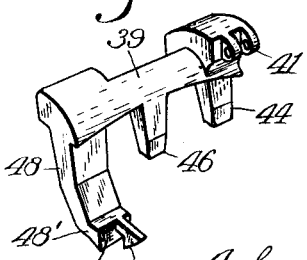
WITNESSES:
J. H. Gardner
M. M. Thomas
INVENTOR:
John H. Bull,
BY
E. T. Silvius,
ATTORNEY.

UNITED STATES PATENT OFFICE.

JOHN H. BULL, OF INDIANAPOLIS, INDIANA.

AUTOMOBILE GEARING-LOCK.

1,036,186.  Specification of Letters Patent.  Patented Aug. 20, 1912.

Application filed July 26, 1911. Serial No. 640,691.

*To all whom it may concern:*

Be it known that I, JOHN H. BULL, a citizen of the United States, residing at Indianapolis, in the county of Marion and State of Indiana, have invented a new and useful Automobile Gearing-Lock, of which the following is a specification, reference being had to the accompanying drawings and to the letters and figures of reference marked thereon.

This invention relates to automobiles that have controlling levers operating in connection with peculiar quadrants, the levers being peculiarly constructed and arranged and adapted to operate and control the clutch and speed changing transmission gearing interposed between the explosion engine and the driving wheels, the invention having reference particularly to means for blocking the controlling lever in the quadrant in mid-position so as to prevent operation of the lever, the block being provided with a suitable lock for securing it in place.

The object of the invention is to provide reliable locking appliances whereby to prevent the theft of automobiles when left standing in streets or elsewhere under ordinary circumstances, a further object being to provide a simple and cheaply constructed locking appliance for automobiles that will be adapted to be readily applied or removed in practice, a still further object being to provide a locking appliance of the above mentioned character that will be strong, durable and economical in use, and be constructed so as to be effective in different quadrants which may differ in length.

With the above mentioned and minor objects in view, the invention comprises an improved sectional hinged lever block adapted to effectually close the spaces in the lever-quadrant of automobiles not occupied by the lever when in mid-position, when the engine is disconnected from the transmission gearing, and means for positively locking the block to the quadrant.

The invention consists further in certain novel parts and in the combination and arrangement of parts as hereinafter particularly described and claimed.

Referring to the drawings, Figure 1 is a fragmentary horizontal section of a well known type of transmission gearing and plan of gear frame and quadrant with which the controlling lever of the gearing and the improved locking appliance are connected; Fig. 2, a front elevation of the controlling lever and quadrant and supporting stand therefor, the locking block being applied in operative position; Fig. 3, a vertical section on the line A A in Fig. 1; Fig. 4, a fragmentary vertical section on the line B B in Fig. 1 on an enlarged scale; Fig. 5, a fragmentary section on the line C C in Fig. 4; Fig. 6, a perspective view of one of the parts of the sectional locking block; Fig. 7, a perspective view of the companion part of the block; and Fig. 8 a perspective view of a suitable lock bolt for locking the block in operative position.

In order that the function and mode of operation of the invention shall be clearly understood, well known transmission gearing and controlling mechanism therefor are briefly described, the numeral 1 indicating a portion of an automobile frame; 2, the transmission gear case; 3, the main shaft of an engine; 4, the driving shaft in alinement with the main shaft; 5, the countershaft on which a suitable number of gear wheels, 6, 7, 8, 9, are secured; 10, a reversing gear wheel mounted on a shaft 11 and meshing with the wheel 9; 12, the driving pinion on or connected to the main shaft 3 and provided with a clutch device 13; 14, a gear wheel splined on the shaft 4 and provided with a clutch device 15, the wheel 14 being clutched directly to the pinion 12 for obtaining high speed and is disconnected when the automobile is at rest or not driven by the engine, the wheel 14 being movable into engagement with the wheel 7 for changing the speed of the drive shaft; 16, a gear wheel splined also on the shaft 4 and movable either into engagement with the wheel 8 for changing the speed or into engagement with the wheel 10 for reversing the motion; 17, the shifter for the wheel 14; and 18, the shifter for the wheel 16.

A suitable stand or supporting member 19 is secured to the automobile frame or otherwise supported as may be desired and a hollow shaft 20 is rotatably mounted therein, another shaft 21 being mounted rotatably in the hollow shaft and extending therethrough, an arm 22 being secured to the shaft 21 and connected with the shifter 17, an arm 23 being secured to the shaft 20 and connected with the shifter 18. The shaft 20 has an upwardly extending arm 24 thereon adjacent to the stand 19, the shaft 21 having an upwardly extending arm 25 thereon that is near the arm 24, and the arms 24 and 25 have bifurcated ends 24' and 25' thereon respectively that extend substantially to a plane midway between the two arms. A collar 26 is rotatably mounted on the shaft 21 between the two arms, and it is provided with a jaw 27 having a pivot pin 28 therein, to which the controlling lever 29 is connected so as to be moved toward either arm and from one to the opposite bifurcated end. The arms 24 and 25 are provided with springs 30 and 31 respectively that engage the lever and normally hold it in mid-position between the two arms, the lever being in engagement with both of the bifurcated ends. The lever is guided in a peculiar quadrant that comprises a curved bar 32 which is supported on the stand 19, two transverse members 33 and 34, a curved bar 35 connected to the transverse members, and two stop bars 36 and 37 supported by the two transverse members between the bars 32 and 35 and extending toward the plane midway between the two transverse members, leaving a gap in which the controlling lever stands when in mid-position, when as is well known the engine can not drive the vehicle.

The locking block comprises two oblong main members 38 and 39 provided respectively with lateral hinging ears 40 and 41 at one end thereof that are connected together by a hinge pin 42, which pin is parallel to the main members, the members being adapted to rest upon the guide bars 32 and 35 of the quadrant, and their hinged ends are provided on their under sides with projections 43 and 44 respectively that in operative position extend into the spaces adjacent the guide bars at opposite sides of one of the stop bars, said main members extending at opposite sides of the controlling lever when in position to block the lever. The middle portions of said members preferably are provided with similar projections 45 and 46 respectively that extend also into said spaces at opposite sides of the lever. The free end portions of the members 38 and 39 are provided with locking arms 47 and 48 respectively, the arms having suitably constructed interlocking ends 47' and 48' respectively that are adapted to extend under the opposite one of the stop bars of the quadrant and to be suitably locked together in connection with the stop bar so as to prevent the removal of the locking block from the quadrant, said arms extending through the spaces at opposite sides of the stop bars.

As illustrating suitable means for locking the stop block in operative position, the end 47' has a longitudinal guideway 49 therein extending from the extremity to a recess 50 formed in the arm, and a lock bolt is provided and mounted slidingly in the arm and comprises a cylindrical portion 51 from which extends a half-round portion 52 in which is a slot 53, the bolt having a flat end portion 54 that is guided in the guideway 49, the slot 53 being in the recess 50, said portion 51 being guided in a guideway 55 formed in the arm. The upper end of the lock bolt is provided with cams 56 for forcing the bolt downward to unlocking position, the bolt being normally forced upward by means of a spring 57 seated in the arm 47 and against the lock bolt, and it will be understood that the bolt and its spring are so inclosed in the arm as to prevent the bolt from being moved downward by external means. The locking end portion 48' has a stop shoulder 58 adapted to contact with the lock bolt, a locking hook 59 projecting from the shoulder and being adapted to pass through the slot 53 in the lock bolt and to be secured to the bolt when the latter is forced upward, the hook being adapted to push the bolt downward when being entered into the slot. A barrel 60 is suitably mounted rotatably in the hinged end portion of the member 38 and extends into the arm 47, and it has cams 61 on its inner end opposing the cams 56, so that when the barrel is rotated in one direction it forces the lock bolt downward. The member 38 has a suitable boss 62 thereon in which are bolts 63 that are normally forced by springs 64 into suitable recesses in a keyway 65 formed in the barrel 60, the barrel having bolts 66 therein of different lengths adapted to retract the bolts 63 to permit the barrel to be rotated by means of a suitable key 67. It should be understood that any other lock construction in the embracing arm of the block, or a padlock for locking the two arms together, are equivalent to the locking apparatus above described as being adapted for the purpose.

In practical use the two embracing arms 47 and 48 are locked together under one of the stop bars 36 or 37 as may be most convenient, the block being adapted to be used in reverse order to that illustrated, and the two members 38 and 39, or more particularly the blocking projections 45 and 46, positively prevent lateral movement of the controlling lever 29 which, as is understood, can not be moved forward or backward when standing between the stop bars 36 and 37. The embracing arms are either forward or rearward of the lever and the hinging ears are at the opposite side of the lever and prevent the block from being removed, or tilted sufficiently to withdraw the guide projections 43 and 44 from the guideways in the quadrant. In some cases the locking block practically fills the space but is equally effective when the quadrant is unusually long. In order to release the operating lever the embracing arms 47 and 48 are unlocked and disconnected, being enabled to swing apart by reason of the hinge, and are then readily withdrawn from the quadrant, and may be conveniently kept in readiness so as to be quickly applied when required.

Having thus described the invention, what is claimed as new is—

1. A gearing lock including two oblong main members, each member having on opposite end portions of one longitudinal side thereof a guide projection and a relatively long embracing arm respectively, the middle portion of said side of the member having a blocking projection thereon, the respective projections and the arm extending from said side of the member approximately at right angles thereto in substantially parallel arrangement approximately in one and the same plane, each member having also hinging ears thereon in proximity to the guide projection, and a hinge pin extending parallel to the longitudinal sides of the main members through the hinging ears.

2. A gearing lock including two oblong main members, one end portion of each member having a laterally extending embracing arm thereon that is approximately equal to the main member in proportion, the opposite end portions of the main members being hinged together, the pin of the hinge extending longitudinally of the main members, one of the arms being provided with a movable lock bolt, the other arm being adapted to be engaged by the bolt, and a key-actuated device mounted partially in the arm that has the lock bolt and partially in the main member that has said arm thereon for operating the bolt.

3. A gearing lock including two oblong main members having transversely extending hinging ears on one side of one end portion thereof respectively, the middle portions of the members having blocking projections thereon respectively, the opposite end portions of the members having embracing arms thereon respectively that are relatively longer than the blocking projections and extend in substantially the same planes with the blocking projections, a hinge pin extending substantially parallel with the oblong main members and connecting the hinging ears of the two main members together to enable the members to swing in parallel arrangement, and means for locking the end portions of the embracing arms together to hold the blocking projections at a distance apart.

4. An automobile gearing lock including two oblong main members hinged together at one side of one end portion thereof, the pin of the hinge extending longitudinally of the members, the opposite side of the opposite end portion of each member having a lateral embracing arm thereon that is approximately equal to the member in dimensions, each member having also a projection on its hinged end portion and a projection on its middle portion, the projections extending laterally from one and the same side of the member and in one and the same plane with the arm, all in parallel order, the projections being relatively shorter than the arm, and means for locking the end portions of the two arms together.

5. An automobile gearing lock including two oblong main members hinged together at one end and provided at the opposite ends respectively with two embracing arms that are approximately equal to the members in dimensions and extending laterally from the members, the hinged end of each member having a guide projection thereon extending laterally in one and the same plane with and parallel to the arm, one of the arms being provided with a lock bolt, the other one of the arms being adapted to be engaged by the lock bolt, and means for operating and controlling the lock bolt.

6. An improved locking block for blocking the controlling lever in the quadrant of automobile gearing to prevent lateral movement of the lever from mid-position, the locking block comprising two oblong members adapted to rest upon the quadrant at opposite sides of the lever, the members being hinged together at one end to engage one other side of the lever and provided at the opposite ends thereof with arms adapted to embrace a portion of the quadrant at the opposite side of the lever from the hinged portions of the members, the members having projections thereon to enter spaces in the quadrant to prevent lateral movement of the lever, the arms being adapted to be locked together.

7. In an automobile gearing lock, the combination of a main member having an embracing arm on one side thereof that is approximately equal to the member in dimensions and is provided with a longitudinal guideway and a recess adjacent the guideway, said member having also a plurality of spring pressed bolts therein projected into the guideway, said side of the member having also a lateral projection thereon that is parallel to the arm, a lock bolt slidingly mounted in the guideway and having a cam on its inner end, the opposite end of the bolt having a slot therein, a barrel rotatably mounted in the guideway and having a cam on its inner end in contact with the cam on said bolt, the barrel having a keyway therein, a plurality of bolts in said keyway in alinement with the spring pressed bolts, and a companion member hinged to said main member and having an embracing arm thereon that is approximately equal to the member in dimensions and is provided with a hook to enter the slot in said locking bolt and be engaged by the bolt, said companion member having also a lateral projection that is parallel to the arm thereon.

In testimony whereof, I affix my signature in presence of two witnesses.

JOHN H. BULL.

Witnesses:
E. T. SILVIUS,
J. H. GARDNER.

Copies of this patent may be obtained for five cents each, by addressing the "Commissioner of Patents, Washington, D. C."